Patented Nov. 3, 1953

2,658,045

UNITED STATES PATENT OFFICE 2,658,045

POLYVINYL PYRROLIDONE GELS AND PROCESS OF PRODUCING THE SAME

Calvin Everett Schildknecht, Montclair, N. J., assignor to General Aniline & Film Corporation, New York, N. Y., a corporation of Delaware No Drawing. Application March 5, 1951, Serial No. 214,012

10 Claims. (Cl. 260—29.6)

This invention relates to novel gels prepared from polyvinyl pyrrolidone and method of preparing them.

The polyvinyl pyrrolidone obtained by polymerization of 1-vinyl-2-pyrrolidone (hereinafter referred to as vinyl pyrrolidone) as described in United States Patent No. 2,265,450, Reppe et al., is soluble in a wide variety of organic solvents and in water, even in the presence of salts. It has outstanding water-binding properties and is characterized by apparent complete freedom from toxicity (orally, on the skin, and parenterally).

I have found that by treating an aqueous solution of polyvinyl pyrrolidone with an inorganic water soluble persulfate (ammonium persulfate, potassium persulfate or sodium persulfate), the solution gels either on long standing, or more quickly and preferably on heating from 50 to 100° C. There is thus obtained a semi-solid, jelly-like and gelled dispersion of polyvinyl pyrrolidone containing none or only a small proportion of water soluble polymer. These gels are continuous and homogeneous and in appearance resemble aqueous gels from gelatin, agar-agar, pectin and Irish moss in translucence and general appearance. However, in contrast to these organic gels, the gels of this invention are not thermo-reversible but are relatively insensitive to heat. They are also much more stable against syneresis than other known gels. Thermally reversible gels depend upon colloidal interaction of hydrated macromolecules without stable cross-linkages being formed between the chain molecules. The gels prepared from polyvinyl pyrrolidone, in accordance with the present invention, by heating a solution of the polymer with an inorganic persulfate seem to contain a regular cross-linked structure, although the detailed mechanism of linkage is not yet known. These novel gels are little changed in mechanical properties on heating from room temperature to 100° C. A uniform increase in turbidity or opalescence is the only pronounced effect on heating. These novel gels are not destroyed by salt solutions.

It has been known that vinyl pyrrolidone polymers can be precipitated from aqueous solutions by trichloroacetic acid and by a number of reagents which precipitate albumins and other proteins. Some polyhydroxy phenolic compounds such as hydroquinone, resorcinol, catechol, pyrogallol and tannic acid also precipitate the vinyl pyrrolidone polymers from aqueous solution. However, the precipitates so formed do not have the gel structure or properties of the gels of this invention. It has also been found that by heating a solution of vinyl pyrrolidone polymer with alkali, the polymers may be precipitated in a permanently insoluble, crosslinked form. This reaction, which may involve an opening of the pyrrolidone ring to form some polyvinyl aminobutyric acid units, has not been found, however, to give continuous gels, even when carried out under relatively mild conditions. Solutions of polyvinyl pyrrolidone have also been treated with a number of other crosslinking agents but in no case have gels been obtained from the vinyl pyrrolidone polymer solutions although the polymer may be precipitated. The polyvinyl pyrrolidone powder may be rendered insoluble, apparently by crosslinking reaction, by heating the powder in air at about 150° C. By such treatment, the polymer becomes yellow or orange and is insolubilized. However, the thus obtained products do not readily swell in water and in no case have continuous gels of good color been obtained. I have also found that on heating polyvinyl pyrrolidone films or solutions with small amounts of sulfuric acid, somewhat gel-like small masses can be obtained but they are brownish in color and are not continuous.

In contrast to the known permanently insolubilized crosslinked products derived from polyvinyl pyrrolidone, and some other water soluble polymers, by treatments of the type mentioned immediately above, the gels or jellies of this invention are continuous and uniform throughout the container or film in which they are formed. They have a high stability to heat and to additions of salts and other agents. They are also very stable to syneresis. A gel standing under air at room temperature for six months had been found to undergo very little syneresis. The softer gels are clear or slightly opalescent by light scattering; they vibrate readily and a glass rod thrust into the mass often shows elastic recovery. Harder gels produced with higher concentrations of persulfate vibrate less readily and are translucent or white opaque.

The general procedure for preparing these novel polyvinyl pyrrolidone gels is to add to an aqueous solution of the polymer either the solid gelling agent, such as ammonium persulfate, or a solution of the agent. The mixture is then made homogeneous by agitation at temperatures below which gelation occurs rapidly. I have found that at room temperature no gelling occurs on standing for several weeks and, accordingly, such soluble persulfates as amonium persulfate, potassium persulfate and sodium persulfate, may readily be dissolved in a solution of polyvinyl pyrrolidone. If desired, however, a solution of the persulfate may be added to a solution of the polyvinyl pyrrolidone without difficulty. The solution of the polyvinyl pyrrolidone and inorganic persulfate may then be gelled by long standing at 50° C. or slightly lower, but preferably the gel is formed by heating the solution of polyvinyl pyrrolidone, to which an inorganic persulfate has been added, to a temperature within the range of 50 to 100° C. At temperatures of about 100° C. the gelling may occur in about one minute. The formation of the gel does not occur by gradual, uniform increase in viscosity. There is very little apparent change in viscosity until near the time of setting. Just before setting to a gel, the mass has a stringy, then liver-like nature. Incipient gel formation might also be called a jellyfish-like consistency.

I have found that useful gels can be produced from vinyl pyrrolidone polymers of a wide range of molecular weight. The type of vinyl pyrrolidone polymers which have heretofore been investigated extensively for use as blood plasma substitutes, and which have an average molecular weight of about 25,000, however, do not give gels having as widely useful properties as do polymers of higher molecular weight although, for special applications, the gels from such polymers of 15 to 25,000 molecular weight may be desirable. The Fikentscher "K value" is used as a designation of the relative molecular weight of vinyl pyrrolidone polymers and, is commonly reported, as determined with 1% aqueous solution of the polymer. The vinyl pyrrolidone polymers having a Fikentscher "K value" near 30 (intrinsic viscosity near 0.2) are the type which have been most widely investigated as blood plasma substitutes. I have found that these polyvinyl pyrrolidone polymers having a K value of 30 or lower are caused to gel with somewhat more difficulty than those of higher polymers, particularly those having average molecular weights of 40,000 to 300,000, K value about 50 to 80. In addition, the gels which form from polyvinyl pyrrolidone of K 30 or lower viscosity value tend to redissolve with large amounts of water and long agitation. These gels appear to contain branched and insufficiently crosslinked modified polymers and are of interest for application as protective colloids, thickening agents and other purposes, but, in general, have somewhat less interest as gels. The vinyl pyrrolidone polymers of K value 50 to 80 are readily converted to gels by the process of the present invention and the gels prepared from such high polymers are substantially insoluble even in large amounts of water, salt solutions or common organic salts. It has been found that the novel gels produced from vinyl pyrrolidone polymers of K 50 to K 80 on treatment with certain oxidizing agents, such as nitric acid, on heating the crosslinkage is broken and the gels dissolve. The resulting polymers have different solubility properties from the polyvinyl pyrrolidone from which the gel was produced. I have successfully obtained gels from vinyl pyrrolidone polymers of K value of 90 or higher, i. e., average molecular weight above 360,000. However, such polymers of K value of 90 or higher are less suitable for the production of gels because they do not dissolve readily in water and the aqueous solutions obtained tend to be non-uniform. I, therefore, prefer the gels produced from vinyl pyrrolidone polymers of K 50 to K 80. I have found that the polymer employed for the production of gels in accordance with the present invention should preferably be free of 1-vinyl-2-pyrrolidone monomer, since the monomer gives discoloration with persulfates on heating.

I have found that in producing the novel gels of this invention readily soluble inorganic peroxides are essential gelling agents. These are ammonium, potassium and sodium persulfates. However, while other oxidizing agents, such as hydrogen peroxide and t-butyl hydroperoxide, and a number of organic persulfates, are not by themselves useful as gelling agents for the production of the novel gels of this invention; I have found that their presence, along with the inorganic persulfates, is not objectionable. I have also found that salts, acids or bases may be added before gelation, if desired, and in general, the best gels are obtained at a pH of 2 to 8. The addition of alkali to give a pH of 8 or above has been found to be undesirable with persulfates because the crosslinked polyvinyl pyrrolidone was discolored, cloud points occurred or the gels were not uniform.

While the present invention has thus far been described in connection with hydrous gels, I have found that not only the hydrous gels but also the partially to completely dehydrated gels have interesting technical possibilities. The novel polyvinyl pyrrolidone gels of this invention, while they resemble in physical appearance the aqueous gels from such organic materials as gelatin, agar-agar, pectin and Irish moss, are in many respects more nearly like the silica gels in that, when the novel gels of the present invention are dried under mild conditions, they retain their uniform crosslinked structure and the capacity to swell again by absorption of large amounts of water. I have found that in dehydrating the hydrated gels of this invention, the dehydration must be carefully conducted in order for the partially to completely dehydrated gel to retain its ability to assume its original appearance on absorption of water. Drying may be effected in vacuum ovens at about 50° C., the hydrous gel being converted to rigid, dried, shrunken material which, when placed in water, becomes greatly swollen and approaches the appearance of the original hydrous gel before dehydration. I have also dried the hydrous gel by placing broken pieces of the hydrous gel on filter paper in a desiccator over calcium chloride and allowing it to stand. The drying was quite slow in this case because of the great tenacity of the gelled polyvinyl pyrrolidone for water and the material was still soft after four days. However, rigid, dried, shrunken masses were obtained after standing two weeks. When these were placed in water, they become greatly swollen and approached the original appearance of the hydrous gel before dehydration. However, a mass of gel which had been broken into pieces of about ¼ inch cross section and dried in a beaker on a hot plate at about 100° C. swelled only slightly on being allowed to stand in water for several days at room temperature.

In order to more fully illustrate the present invention there is described in tabular form in the table below a number of experiments I have conducted in which gels were produced by treating aqueous solutions of polyvinyl pyrrolidone with water soluble inorganic persulfates. In these experiments the gels were prepared by adding to an aqueous solution of vinyl pyrrolidone polymer the amount of persulfate, shown in the table, as a dry powder. The mixture was then stirred at room temperature until the persulfate was dissolved and the solution then heated to the temperature and for the time shown in the table. The table also shows the approximate K value of the vinyl pyrrolidone polymers, the concentration and amount of the aqueous solution of these polymers which were used in each of these experiments.

Table

| K value (approx.) of polyvinyl pyrrolidone used | Polyvinyl pyrrolidone solution | | Persulfate added | Amount of persulfate added, grams | Heating conditions | Description of gel formed |
|---|---|---|---|---|---|---|
| | Amount of solution, grams | Concentration of solution, percent | | | | |
| 55 | 10 | 5 | $(NH_4)_2S_2O_8$ | 0.5 | 24 hrs., 25° C., then 4 hrs., 50° C. | Translucent gel, uniform. |
| 30 | 5 | 10 | $(NH_4)_2S_2O_8$ | 0.5 | 10 min., 90° C | Hazy gel. |
| 55 | 10 | 5 | $(NH_4)_2S_2O_8$ | 0.5 | 5 min., 90° C | Translucent gel. |
| 30 | 10 | 10 | $(NH_4)_2S_2O_8$ | 2.0 | 3 hrs., 80° C | Soft brownish gel. Did not flow on heating to 80° C. Dissolved in excess cold water. |
| 55 | 10 | 5 | $K_2S_2O_8$ | 0.6 | 5 min., 80° C | Stiff opaque gel, vibrating when struck. |
| 55 | 20 | 5 | $(NH_4)_2S_2O_8$ | 0.8 | 10 min., 75° C | Clear, uniform vibrating gel. |
| 55 | 10 | 5 | $(NH_4)_2S_2O_8$ | 0.5 | ½ hr., 80° C | Soft gel. |
| 55+¹ | 10 | 5 | $(NH_4)_2S_2O_8$ | 0.5 | ½ hr., 80° C | Clear vibrating gel. |
| 55+¹ | 10 | 2.5 | $(NH_4)_2S_2O_8$ | 1.0 | ½ hr., 80° C | Opaque solid gel. |
| 55+¹ | 10 | 2.5 | $(NH_4)_2S_2O_8$ | 0.5 | ½ hr., 80° C | Soft gel. |
| 60 | 10 | 7.5 | $(NH_4)_2S_2O_8$ | 1.0 | 5 min., 80° C | Excellent vibrating gel; opalescent when hot; clear at 25° C. |
| 60 | 10 | 10 | $(NH_4)_2S_2O_8$ | 1.0 | 1 hr., 80° C | Soft clear gel. |
| 60 | 20 | 7.5 | $(NH_4)_2S_2O_8$ | 1.0 | 1 hr., 80° C | Very soft, clear gel. |
| 80 | 10 | 5 | $(NH_4)_2S_2O_8$ | 0.5 | 10 min., 80° C | Good, slightly hard gel. |
| 90 ² | 20 | 5 | $(NH_4)_2S_2O_8$ | 0.5 | 2 hr., 80° C | Soft, clear gel, fairly uniform. |

¹ A low molecular fraction had been removed from this polymer by extraction at room temperature by acetone.
² This polymer in 20% aqueous solution showed some liveriness suggesting it was partially crosslinked before treatment with persulfate.

It will be apparent from the above table that the amount of persulfate required to produce a satisfactory gel is an amount by weight approximately equal to the weight of the vinyl pyrrolidone polymer. In general, the use of relatively small amounts of persulfates, say, an amount by weight equal to ½ the polymer, results in a soft gel being formed, while higher amounts up to, say two times the weight of the polymer, results in a stiffer gel being formed. The specific amount employed will, therefore, depend on the particular consistency of the gel desired and may be determined by simple preliminary experiments. It will be apparent that the gels, if desired, may be formed as films and, if desired, filaments may be spun from solutions of vinyl pyrrolidone high polymers and copolymers and in the presence of some residual solvent, this may be stretched and oriented and then heated with persulfate to give insoluble fibers. Persulfates may be used in this way also to render insoluble polyvinyl pyrrolidone adhesives which have remarkable tenacity for bonding glass and certain other surfaces. Solvents, plasticizers and other modifiers miscible with polyvinyl pyrrolidone solutions may be present as well as dispersed pigments or fillers.

I claim:

1. A method of producing gels of polymeric vinyl pyrrolidone which comprises treating an aqueous solution of N-vinyl pyrrolidone polymer having a K value of 50 to 80 with a water soluble inorganic persulfate in an amount substantially equal by weight to the weight of the polymer and heating the mixture to cause gelation.

2. The method as defined in claim 1 wherein the persulfate is ammonium persulfate.

3. The method as defined in claim 1 wherein the persulfate is sodium persulfate.

4. The method as defined in claim 1 wherein the persulfate is potassium persulfate.

5. Hydrous to dehydrated gels of polymeric N-vinyl pyrrolidone obtained by treating an aqueous solution of a water soluble N-vinyl pyrrolidone polymer with an approximately equal amount by weight of a water soluble inorganic persulfate and heating the same to cause gelation, said gels in hydrous form being characterized in that they are uniform and continuous and resistant to syneresis and insensitive to heat up to 100° C.

6. Hydrous to dehydrated gels of polymeric N-vinyl pyrrolidone having a K value of 50-80 obtained by treating an aqueous solution of a water soluble N-vinyl pyrrolidone polymer with an approximately equal amount by weight of a water soluble inorganic persulfate and heating the same to cause gelation, said gels in hydrous form being characterized in that they are uniform and continuous and resistant to syneresis and insensitive to heat up to 100° C.

7. The method of producing gels of polymeric vinyl pyrrolidone which comprises treating an aqueous solution of a water soluble N-vinyl pyrrolidone polymer with an approximately equal amount by weight of a water soluble inorganic persulfate and heating the same to cause gelation.

8. The method as defined in claim 7 wherein the persulfate employed is ammonium persulfate.

9. The method as defined in claim 7 wherein the persulfate employed is sodium persulfate.

10. The method as defined in claim 7 wherein the persulfate employed is potassium persulfate.

CALVIN EVERETT SCHILDKNECHT.

References Cited in the file of this patent

UNITED STATES PATENTS

| Number | Name | Date |
|---|---|---|
| 2,335,454 | Schuster | Nov. 30, 1943 |
| 2,442,330 | Fuller | June 1, 1948 |

OTHER REFERENCES

Kline: Modern Plastics, Nov. 1945, pages 157–161, 212, 214, 216, and 218.